(12) United States Patent
Glaros et al.

(10) Patent No.: US 12,590,935 B2
(45) Date of Patent: Mar. 31, 2026

(54) BIO-IDENTIFICATION USING LOW RESOLUTION TANDEM MASS SPECTROMETRY

(71) Applicants: VANDERBILT UNIVERSITY, Nashville, TN (US); THE UNITED STATES OF AMERICA AS REPRESENTED BY THE SECRETARY OF THE ARMY, WASHINGTON, DC, Washington, DC (US); TRIAD NATIONAL SECURITY, LLC, Los Alamos, NM (US)

(72) Inventors: Trevor C. Glaros, Albuquerque, NM (US); Phillip Mach, Aberdeen Proving Ground, MD (US); Richard Caprioli, Brentwood, TN (US); Jeremy Norris, Smyrna, TN (US)

(73) Assignees: VANDERBILT UNIVERSITY, Nashville, TN (US); THE UNITED STATES OF AMERICA AS REPRESENTED BY THE SECRETARY OF THE ARMY, WASHINGTON, DC, Washington, DC (US); TRIAD NATIONAL SECURITY, LLC, Los Almos, NM (US)

( * ) Notice: Subject to any disclaimer, the term of this patent is extended or adjusted under 35 U.S.C. 154(b) by 304 days.

(21) Appl. No.: 18/285,988

(22) PCT Filed: Apr. 6, 2022

(86) PCT No.: PCT/US2022/023616
§ 371 (c)(1),
(2) Date: Oct. 6, 2023

(87) PCT Pub. No.: WO2022/216788
PCT Pub. Date: Oct. 13, 2022

(65) Prior Publication Data
US 2024/0242950 A1     Jul. 18, 2024

Related U.S. Application Data

(60) Provisional application No. 63/171,767, filed on Apr. 7, 2021.

(51) Int. Cl.
*G01N 30/86* (2006.01)

(52) U.S. Cl.
CPC ................................ *G01N 30/8686* (2013.01)

(58) Field of Classification Search
USPC ........................................................ 250/282
See application file for complete search history.

(56) References Cited

U.S. PATENT DOCUMENTS

| | | | |
|---|---|---|---|
| 2009/0302210 A1 | 12/2009 | Castro-Perez et al. | |
| 2020/0381229 A1 | 12/2020 | Trede et al. | |
| 2021/0313160 A1* | 10/2021 | Eiler ................... | H01J 49/0045 |

FOREIGN PATENT DOCUMENTS

| | | |
|---|---|---|
| CN | 109830426 A | 5/2019 |
| JP | 2008-529035 A2 | 7/2008 |

(Continued)

OTHER PUBLICATIONS

European Search Report, EP App. 22785349.6, issued Feb. 6, 2025.

(Continued)

*Primary Examiner* — Kiet T Nguyen
(74) *Attorney, Agent, or Firm* — Thomas | Horstemeyer, LLP

(57) ABSTRACT

Systems and devices are disclosed to generate a multidimensional mass fingerprint that allows for identification on a low-resolution mass spectrometer equipped with post-ionization fragmentation. For this approach, rather than interrogating a sample that is processed into peptides using (Continued)

a single high resolution MS scan as in traditional finger-printing, a raw unprocessed sample (containing all bio-chemical species: lipids, proteins, peptides, and metabolites) is analyzed by combining Matrix-Assisted Laser Dissocia-tion/Ionization (MALDI) ionization with low resolution tandem mass spectrometry. The proposed system combines improvements in MS hardware and software with state-of-the-art machine learning (ML) approaches to usher in rapid biological detection. This technique does not require any prior separation (liquid or gas chromatography) and is therefore rapid (e.g. less than 5 sec) and amenable to high throughput (e.g. greater than 384 samples/hr).

14 Claims, 6 Drawing Sheets

(56)                References Cited

FOREIGN PATENT DOCUMENTS

| | | | |
|---|---|---|---|
| JP | 2009-222664 | A2 | 10/2009 |
| JP | 2020-519870 | A2 | 7/2020 |
| WO | 2019/065580 | A1 | 4/2019 |

OTHER PUBLICATIONS

Liu, Qingqing, et al., "Discovery and Identification of Arsenolipids Using a Precursor-Finder Strategy and Data-Independent Mass Spectrometry," Environ. Sci. Technol., vol. 55 (2021), pp. 3836-3844.

Dieckmann, R., et al., "Rapid screening and dereplication of bac-terial isolates from marine sponges of the Sula Ridge by Intact-Cell-MALDI-TOF mass spectrometry (ICM-MS)," Appl. Microbiol. Biotechnol., vol. 67 (2005), pp. 539-548.

Sauer, Sasch, et al., "Mass spectrometry tools for the classification and identification of bacteria," Nature, vol. 8 (2010), pp. 74-82.

Sandrin, Todd R., et al., "MALDI TOF MS Profiling of Bacterial At The Strain Level: A Review," Mass Spectrometry Reviews, vol. 32 (2013), pp. 188-217.

Carbonnelle, Etienne, et al., "MALDI-TOF mass spectrometry tools for bacterial identification in clinical microbiology laboratory," Clinical Biochemistry, vol. 44 (2011), pp. 104-109.

De Bruyne, Katrein, et al., "Bacterial species identification from MALDI-TOF mass spectra through data analysis and machine learning," Systematic and Applied Microbiology, vol. 34 (2011), pp. 20-29.

Office Action for Japanese Application 2023-562260 mailed Feb. 3, 2026.

* cited by examiner

BIO-IDENTIFICATION USING LOW RESOLUTION TANDEM MASS SPECTROMETRY

CROSS-REFERENCE TO RELATED APPLICATIONS

This application is a National Stage of International Application No. PCT/US2022/023616, filed Apr. 6, 2022, which claims benefit of U.S. Provisional Application No. 63/171,767, filed Apr. 7, 2021, which is hereby incorporated herein by reference in its entirety.

BACKGROUND

Over the last two decades, there has been an explosion of new rapid detection and diagnostic assays which can be used in the field or at the bedside. Most of these technologies are antibody-based which are fraught with false positives & negatives and require prior knowledge regarding the causative organism. These detection modalities are easily defeated by genetic engineering thereby representing a weak point for defense against biological weapons and emerging pathogens. Modern genomic technologies like PCR have addressed the issue of specificity but are costly to run, require a significant amount of sample preparation, must be performed in a brick and mortar laboratory, and can result in false negatives via genetic engineering or by naturally acquired mutations. Taken together, these confines limit the throughput and are far from real-time, offering results no sooner than 4-5 hours post-sampling.

SUMMARY

A multidimensional mass fingerprint is disclosed that allows for identification on a low-resolution mass spectrometer equipped with post-ionization fragmentation. For this approach, rather than interrogating a sample that is processed into peptides/proteins using a single high resolution MS scan as in traditional fingerprinting, a raw unprocessed sample (containing all biochemical species; lipids, proteins, peptides, and metabolites) is analyzed by combining ionization with low resolution tandem mass spectrometry. The proposed system combines improvements in MS hardware and software with state-of-the-art machine learning (ML) approaches to usher in rapid biological detection. Central to these efforts is the creation of a multidimensional mass fingerprint that is comprised of a parent mass scan (MS1) and a series of fragment mass scans (MS2) all obtained from a single sample, ideally minimally processed to diminish variability attributed to sample processing. This technique does not require any prior separation (liquid or gas chromatography) and is therefore rapid (e.g., less than 5 sec) and amenable to high throughput (e.g., greater than 384 samples/hr).

As illustrated in FIG. 1, the systems and methods involve obtaining and recording a mass scan (MS1) of the sample of interest as introduced into the mass spectrometer via an ionization technique, such as Matrix-Assisted Laser Dissociation Ionization (MALDI), Electrospray Ionization (ESI), Nanospray Ionization (NSI), Desorption Electrospray Ionization (DESI), or Paper Spray Ionization (PSI). This is referred to herein as a "first dimension." An example MS1 scan is shown in FIG. 2.

The systems and methods further involve obtaining and recording a series of fragment mass scan (MS2) from stepped predefined mass windows. This is referred to herein as a "second dimension." These mass windows can vary in size, e.g. can range from a single ion to the entire MS1 mass range. In some embodiments, the windows are approximately 100-200 m/z. The windows can be uniform or vary in sizes. The windows can span the entire spectrum, or they can be focused to information rich regions of the MS1 scan. In some embodiments, the windows are non-overlapping as depicted in FIG. 3. In other embodiments, the windows are overlapping as depicted in FIG. 4.

In embodiments, non-limiting examples of mass spectrometry comprise secondary ion mass spectrometry, laser desorption mass spectrometry, matrix assisted laser desorption/ionization mass spectrometry, electrospray mass spectrometry, or desorption electrospray ionization.

Finally, the systems and methods further involve combining the MS1 and MS2 spectral data, generating a unique multi-dimensional fingerprint. The unique mass fingerprint can be comprised of all performed scans which should remain fixed once generated allowing for a comparison as depicted in FIG. 5. This mass fingerprint can become part of a library which can be compared to unknown samples for identification of the species ands strain level. Compilation of this library would also likely identify unique signatures at both the MS1 and MS2 levels that would allow for presumptive identification, such as at the genus or species level, of an organism that is not in the library.

In some embodiments, these data are analyzed with machine learning to match the fingerprint to a specific organism (species/strain) or biomaterial. Therefore, the disclosed systems and devices can further include a database of mass fingerprints produced by the disclosed methods for a variety of organisms and/or biomaterials.

The disclosed systems and methods can be used to provide a fingerprint of bacteriological species, including proteins, peptides, lipids, and other molecules of interest that directly correlate to species level identification and growth conditions as depicted in FIG. 6.

The disclosed methods can be used to detect and identify the presence of any biological or chemical entities, including chemicals, compounds, cells, or organisms in a sample. This can be done for diagnostic purposes in the case of pathogens or disease (e.g. cancer). The disclosed systems and methods can, for example, be used with tissue biopsies. This could be useful in terms of replacing traditional tissue staining and microscopy techniques which rely on human judgement.

In some embodiments, the disclosed systems and methods are used to detect and identify harmful chemicals or organisms in a sample from a subject or from an environment. Clinical samples include pure/culture samples or clinical samples with little to no prior sample preparation.

In some embodiments, the disclosed systems and methods are used to identify the presence of harmful biological or chemical agents.

In some embodiments, the disclosed systems and methods are used to diagnose an infection or chemical exposure for point-of-care applications.

In some embodiments, disclosed systems and methods can be used to provide a fingerprint of tissue samples, including proteins, peptides, lipids, and other molecules of interest that directly correlate to disease states, including but not limited to cancer, diabetes, and infectious diseases.

In some embodiments, the disclosed systems and methods can incorporate a spatial analysis of the biological sample for the purpose of correlating the molecular fingerprint with specific cell types or tissue substructures. This correlation can be accomplished in a targeted experiment, guided by a physician. Alternatively, the entire tissue surface may be interrogated using a regular sample raster, rendering an image of each component of the molecular fingerprint.

In embodiments, the methods as described herein can further comprise the step of obtaining a sample from said subject. For example, the subject can be a mammalian subject, for example, a human subject. In some embodiments, the mammal can be a canine, feline, or equine. In this example, a tissue sample can be obtained from the subject, and tested for biomarkers of melanoma using methods as described herein. The tissue can be obtained using methods known in the art.

In embodiments, methods as described herein can further comprise the step of performing a mass spectrometric analysis of a specimen with a known biological state. For example, the known cancerous lesion can be obtained from the subject whose sample tissue is being tested using embodiments and methods as described herein. In embodiments, the methods as described herein can further comprise performing histologic analysis on the tissue sample. Further, embodiments as described herein can also comprise performing immunohistochemical analysis on the tissue sample. Embodiments as described herein can determine a subject's diagnosis, prognosis, or therapeutic approach. Embodiments as described herein can be used in combination with other methods known to the art to determine a subject's diagnosis, prognosis, or therapeutic approach.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
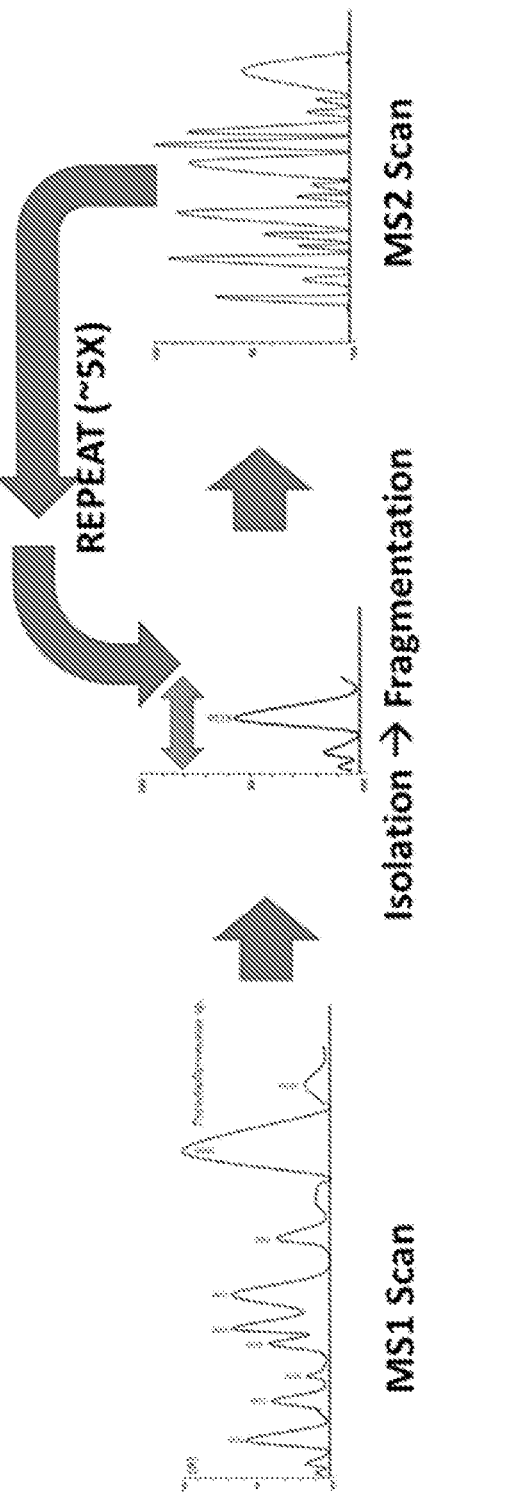
FIG. 1 shows multi-dimensional mass fingerprinting. To obtain a multi-dimensional fingerprint a primary MS1 scan is acquired much like the traditional process. Then, large mass regions of interest (~100-200 m/z) are isolated and fragmented. The fragments are then 'read/scanned' by performing a MS2 scan. This series of events can then be repeated on other ion regions of interest within the initial MS1 scan until the sample is exhausted or all desired data is captured. All spectral data was then processed and compiled to generate a novel fingerprint. By adding the second dimension of information (MS2), the molecular details captured increase by at least an order of magnitude allowing for strain level identification using a low resolution, portable mass spectrometer.
Figure 2:
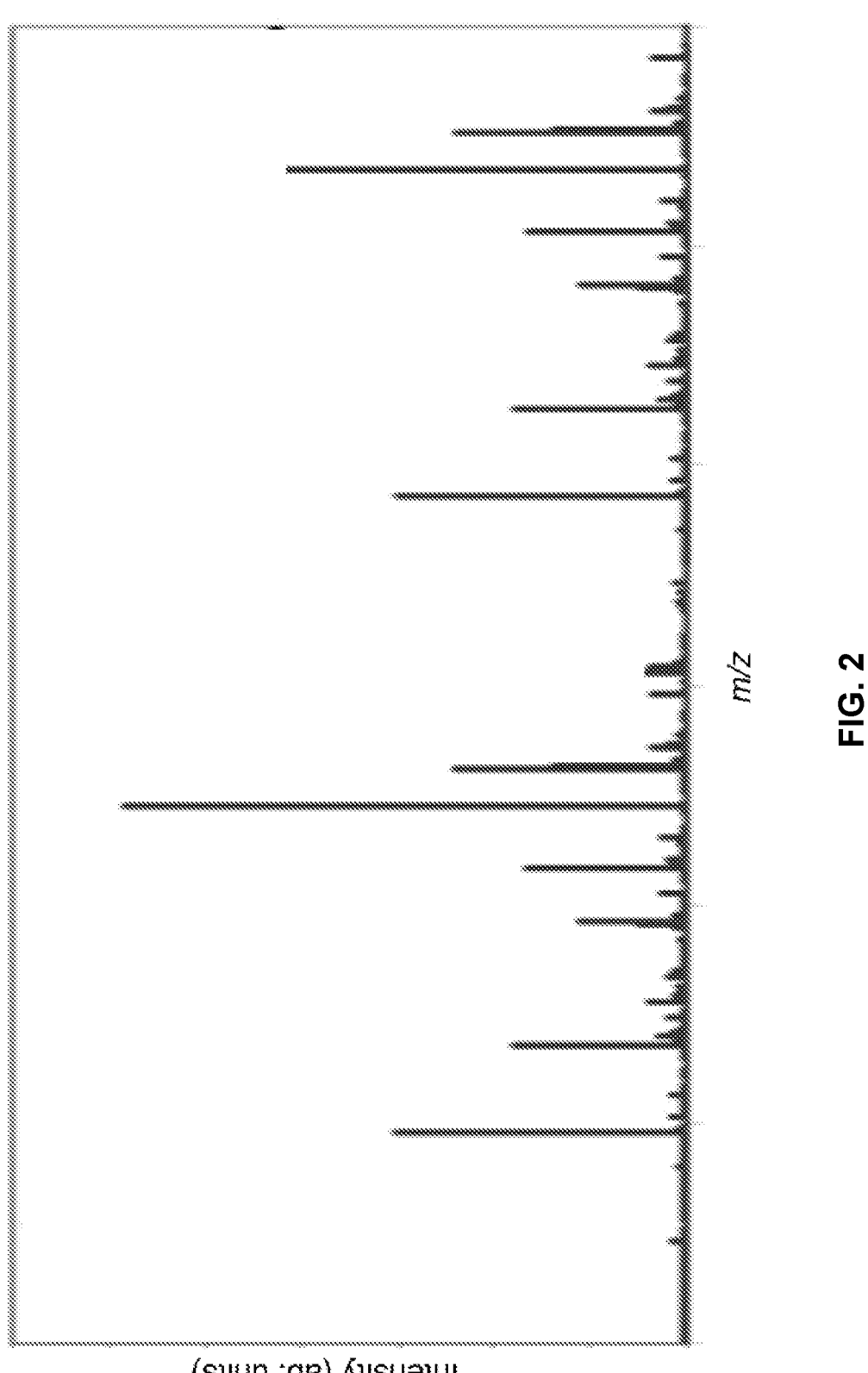
FIG. 2 shows an example full mass scan obtained on a low resolution instrument.
Figure 3:
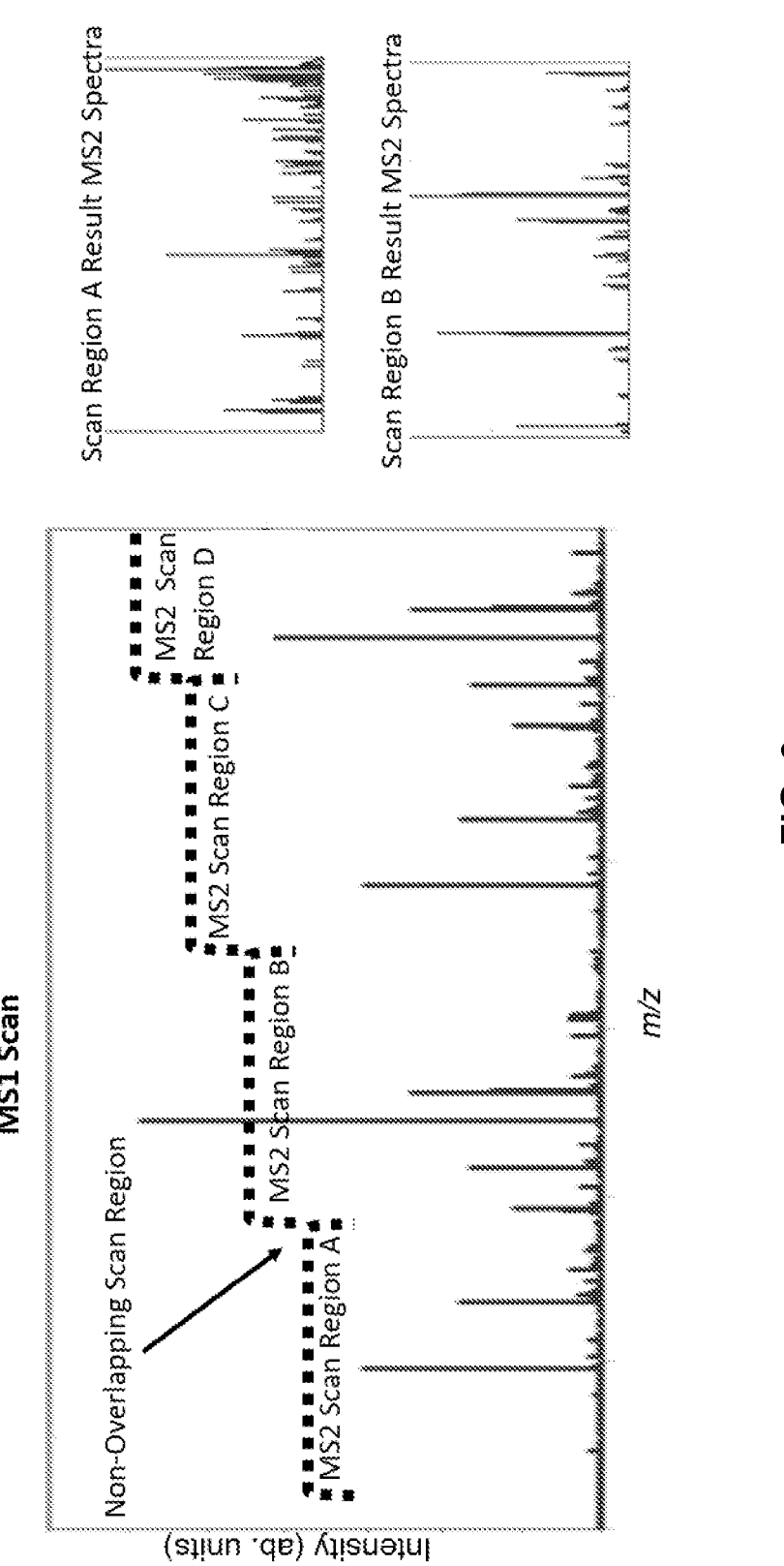
FIG. 3 shows an example of non-overlapping isolation windows for MS2 scans depicted on a MS1 scan.
Figure 4:
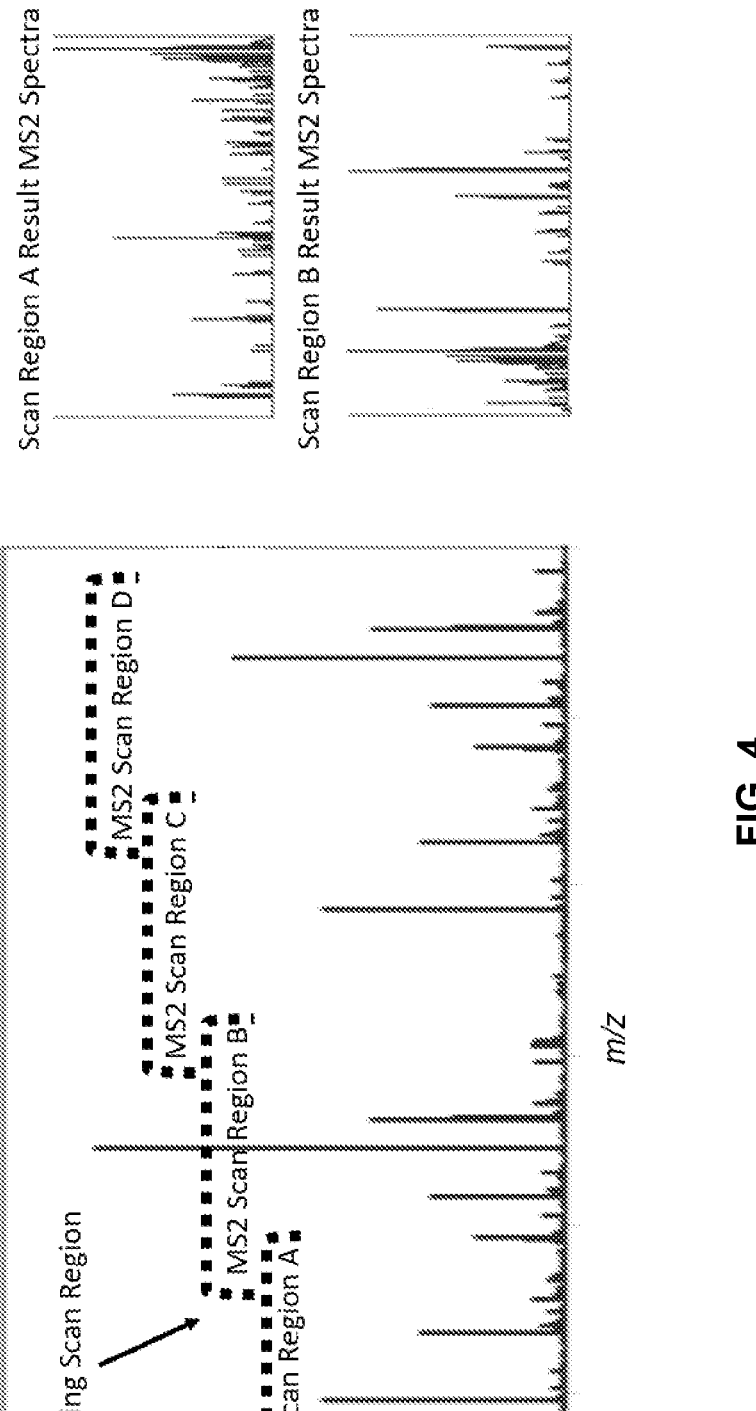
FIG. 4 shows an example of overlapping isolation windows for MS2 scans.
Figure 5:
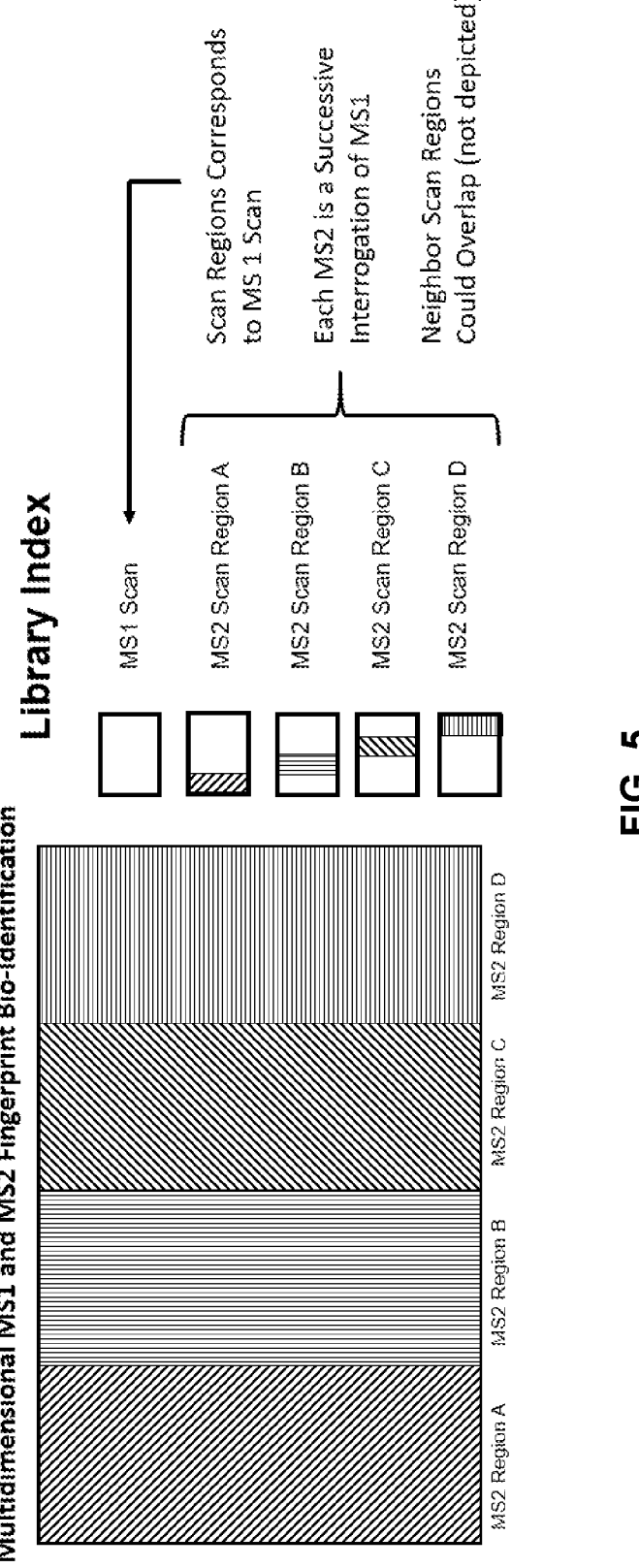
FIG. 5 shows an example for a final multidimensional mass fingerprint that is a library of masses captured at the MS1 and MS2 levels. This library can be indexed and unique masses at each level can be identified.
Figure 6:
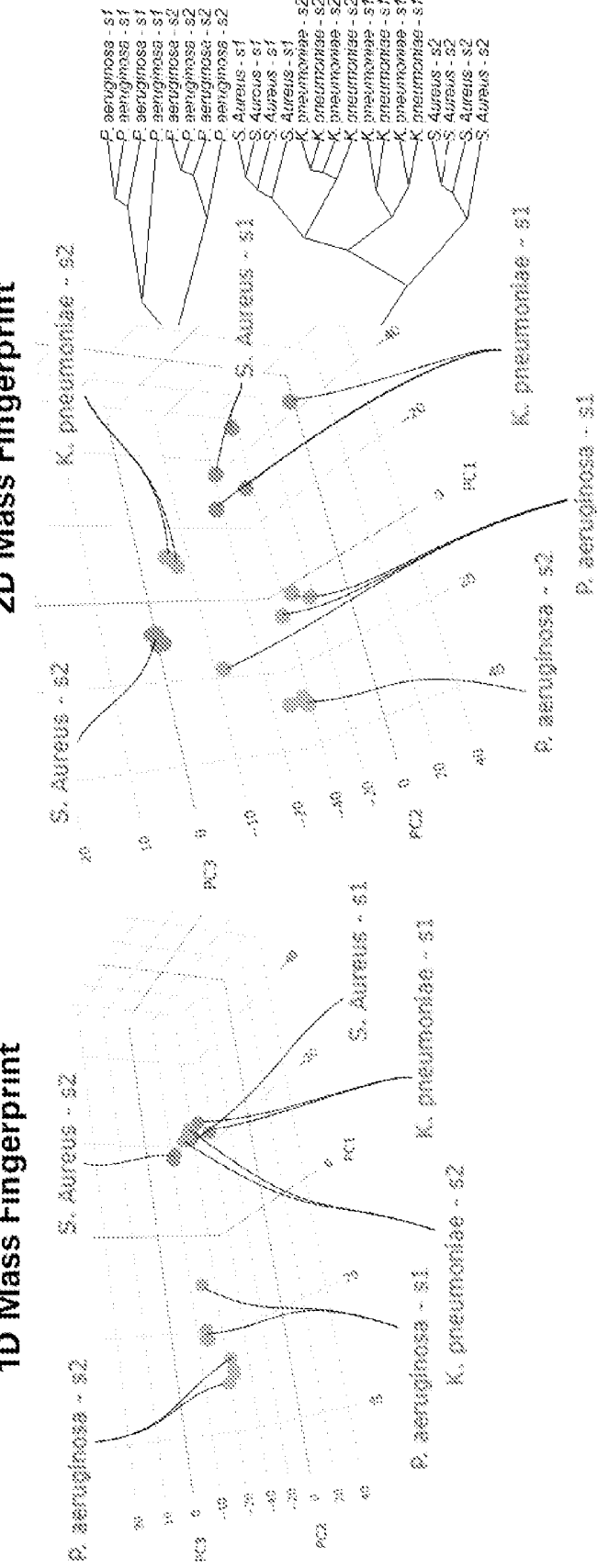
FIG. 6 shows two strains each of *Klebsiella pneumoniae, Pseudomonas aeruginosa*, and *Staphylococcus aureus* were analyzed using both a 1-dimensional and a 2-dimensional approach as defined above. Using unsupervised classification approaches, principal component analysis and hierarchical clustering, improved differentiation of each microbe was achieved by incorporating the second-dimension scan.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, biology, and the like, which are within the skill of the art.

The following examples are put forth so as to provide those of ordinary skill in the art with a complete disclosure and description of how to perform the methods and use the probes disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise.

Mass spectrometry technologies have been demonstrated to have best-in-class sensitivity and specificity for the detection and identification of pathogens in clinical settings utilizing an approach known as mass fingerprinting. In brief, protein is extracted from clinical samples, processed into peptides and then resolved by performing a parent mass scan (MS1) on a high-resolution mass spectrometer to yield a unique "mass fingerprint". These FDA-approved instrument platforms are not designed to operate in harsh environments required for widespread deployment to the front lines or in point-of-care settings. As a direct result, diagnostic mass spectrometry technologies are limited to centralized, brick and mortar laboratories accompanied with highly trained staff. Furthermore, like genomic sequencers, the cost of these systems is generally greater than $350K, preventing deployment at scale. With current technology, the combination of high cost and complexity slows the dissemination of the much-needed real-time information concerning pathogen exposure. Portable, low-cost MS systems exist today, but have largely been developed for the detection and quantification of chemical warfare agents. Due to the need for portability, performance compromises were necessary. These compromises have prevented this technology from moving into the biological detection space. Despite some technical improvements in the last five years, critical and fundamental limitations in instrument mass range and resolution still present a barrier to detecting biomolecules unique to bacteria or viruses using traditional mass fingerprinting approaches.

Disclosed herein are systems and methods that leverage and improve existing portable miniaturized instrument designs, using low resolution tandem mass spectrometry to acquire high fidelity data that can be used to make a biological identification in complex environmental and clinical backgrounds without sample preparation—thus replacing the need for expensive high resolution mass spectrometry.

To overcome the limitations of the current state-of-the-art in miniaturized mass spectrometry to achieve bacterial and viral identification, a multidimensional mass fingerprint can be obtained allowing for identification on a low-resolution mass spectrometer equipped with post-ionization fragmentation. For this approach, rather than interrogating a sample that is processed into peptides using a single high resolution MS scan as in traditional fingerprinting, the disclosed systems and methods analyze a raw unprocessed sample (containing all biochemical species; lipids, proteins, peptides, and metabolites) by combining ionization with low-resolution tandem mass spectrometry. The proposed effort aims to combine improvements in MS hardware and software with machine learning (ML) approaches to usher in rapid biological detection.

Central to these efforts is the creation of a multidimensional mass fingerprint which is comprised of a parent mass scan (MS1) and a series of fragment mass scans (MS2) all obtained from a single sample. This technique does not require any prior separation (liquid or gas chromatography) and is therefore rapid (e.g. less than 5 sec) and amenable to high throughput (e.g. greater than 384 samples/hr). An embodiment of this approach is depicted in FIG. 1.

Mass spectrometry is an analytical technique in which samples are ionized into charged molecules and ratio of their mass-to-charge (m/z) can be measured. In some embodiments, the ion source for the mass spectrometry is matrix-assisted laser desorption/ionization (MALDI).

MALDI is a soft ionization that involves a laser striking a matrix of small molecules to make the analyte molecules into the gas phase without fragmenting or decomposing them. Some biomolecules are too large and can decompose when heated, and traditional techniques will fragment or destroy macromolecules. MALDI is appropriate to analyze biomolecules like peptides, lipids, saccharides, or other organic macromolecules.

The MALDI process is described in further detail in International Publication No. WO-2009/065580A1 to Ulrich Weller entitled "Identification of Pathogens in Bodily Fluids," the content of which is hereby incorporated in its entirety.

In some embodiments, the analyte is embedded in a very large excess of a matrix compound deposited on a solid surface called a target, usually made of a conducting metal and having spots for several different samples to be applied. After a very brief laser pulse, the irradiated spot is rapidly heated and becomes vibrationally excited. The matrix molecules energetically ablated from the surface of the sample, absorb the laser energy and carry the analyte molecules into the gas phase as well. During the ablation process, the analyte molecules are usually ionized by being protonated or deprotonated with the nearby matrix molecules. The most common MALDI ionization format is for analyte molecules to carry a single positive charge.

There are various types of lasers used in MALDI, including lasers of both ultraviolet (UV) and infrared (IR) wavelengths, but UV lasers are by far the most common light sources in analytical MALDI. Among these, nitrogen lasers and frequency-tripled or quadrupled Nd:Yag lasers often serve for the majority of applications. IR-MALDI is dominated by Er:Yag lasers while TEA-$CO_2$ lasers are occasionally used.

It is believed that the first function of the matrix is essentially to dilute and isolate analyte molecules from each other. This occurs during solvent evaporation and concomitant formation of a solid solution. Then, upon laser irradiation, it functions as a mediator for energy absorption. The choice of the right matrix is key to the success in MALDI. In general, highly polar analytes work better with highly polar matrices, and nonpolar analytes are preferably combined with nonpolar matrices. Different matrixes have been sought and widely used, such as Nicotinic acid, Picolinic acid, 3-Hydroxypicolinic acid, 3-Aminopicolinic acid, 6-Aza-2-thiothymine, 2,5-Dihydroxybenzoic acid, DHB-based mixtures, 3-Aminoquinoline, α-Cyano-4-hydroxycinnamic acid, 4-Chloro-α-cyano-cinnamic acid, 3,5-Dimethoxy-4-hydroxycinnamic acid, 2-(4-Hydroxyphenylazo) benzoic acid, 2-Mercaptobenzothiazole, 5-Chloro-2-mercaptobenzothiazole, 2,6-Dihydroxyacetophenone, 2,4,6-Trihydroxyacetophenone, Dithranol (1,8,9-anthracenetriol), 9-Nitroanthracene, Benzo[a]pyrene, and 2-[(2E)-3-(4-tert-Butylphenyl)-2-methylprop-2-enylidene]malonitrile. Currently, the most commonly used matrixes are α-cyano-4-hydroxycinnamic acid, 2,5-dihydroxybenzoic acid, 3,5-dimethoxy-4-hydroxycinnamic acid, and 2,6-dihydroxyacetophenone.

In some embodiments, tandem mass spectrometry is used to measure the ratio of their mass-to-charge (m/z). Tandem mass spectrometry, also known as MS/MS, is a technique in instrumental analysis where two or more mass analyzers are coupled together using an additional reaction step to increase their abilities to analyze chemical samples. Once the analyte is ionized, the first spectrometer (designated MS1) separates these ions by their mass-to-charge ratio (often given as m/z or m/Q). Ions of a particular m/z-ratio coming from MS1 are selected and then made to split into smaller fragment ions, e.g. by collision-induced dissociation, ion-molecule reaction, or photodissociation. These fragments are then introduced into the second mass spectrometer (MS2), which in turn separates the fragments by their m/z-ratio and detects them. The selection-fragmentation-detection sequence can be further extended to the first-generation product ions. For example, selected product ions generated in MS2 can be further fragmented to produce another group of product ions (MS3) and so on. The fragmentation step makes it possible to identify and separate ions that have very similar m/z-ratios in regular mass spectrometers.

Since Tandem MS involves three distinct steps of selection-fragmentation-detection, the separation of these three steps can be realized in space or in time. Typical Tandem MS in space instruments include QqQ, QTOF, and hybrid ion trap/FTMS, etc. Typical Tandem-in-Time MS/MS instruments include ion trap and FT-ICR MS.

Precursor ions can be activated (with increased internal energy) in many different ways. Fragmentation patterns depend on how energy is transferred to the precursor ion, the amount of energy transferred, and how the transferred energy is internally distributed. Collision-induced dissociation and infrared multiphoton dissocition are "slow-heating" techniques that increase the Boltzmann temperature of the ion and thus preferentially cleave the weakest bonds to produce mainly b and y ions. These techniques are quite efficient for peptides, lipids and other relatively small chemical compounds, but may also remove protein post-translational modifications (e.g., phosphates and sugars). Electron capture dissociation and electron transfer dissociation mainly produce c and z ions while preserving post-translational modifications (PTMs). Thus, ECD and ETD are widely applied to proteins and peptides with labile PTMs. For oligosaccharides (including glycolipids), ECD/ETD can also generate cross-ring cleaved a and z ions, which are crucial for localization of glycosidic bonds.

Tandem mass spectrometry includes triple quadrupole mass spectrometer (QqQ), quad time of flight (Q-TOF), and hybrid mass spectrometer. Triple quadrupole mass spectrometers use the first and third quadrupoles as mass filters. When analytes pass the second quadrupole, the fragmentation proceeds through collision with gas. Usually used for the pharmaceutical industry. Quadrupole time of flight (Q-TOF) mass spectrometer combines TOF and quadrupole instruments, which cause high mass accuracy for product ions, accurate quantitation capability, and fragmentation experiment applicability. This is a method of mass spectrometry that ion fragmentation (m/z) ratio determined through a time of flight measurement. Hybrid mass spectrometer consists of more than two mass analyzers.

In some embodiments, the spectrometer used in the disclosed systems and methods is a low-resolution instrument. Low resolution instruments typically discriminate ions with a difference in mass of 0.2 mass unites (m.u.) (R=1000 for M=200), while a high resolution instrument can discriminate ions with a difference in mass of 0.0001 m.u. (R=2,000,000 for M=200).

The disclosed method involves generating a multi-dimensional fingerprint from the combination of MS1 and MS2 mass spectral data. In some embodiments, this is done using a machine learning classification model. In some implementations, the machine-learning classification model includes a convolutional neural network classifier. In embodiments, the sample comprises any desired bodily tissue, non-limiting examples of which comprise blood, serum, cerebrospinal fluid, urine, sweat, saliva, skin, skin punches, or solid tissue biopsies. In embodiments, the multi-dimensional fingerprint is also known as the molecular profile. In embodiments, the multi-dimensional fingerprint comprises one molecule or a plurality of molecules. Non-limiting examples of types of molecules represented in the mass spectrometric profile comprise proteins, peptides, lipid, metabolites, nucleic acids or a combination thereof. In embodiments, the similarity of the sample from the subject to a known profile, such as a known molecular profile, is determined using a statistical or machine learning algorithm. Non-limiting examples of the machine learning algorithm comprise a genetic algorithm, support vector machine, or supervised neural network. In some embodiments, a similarity is determined by assessing whether the peak(s) displayed in a mass spectrometric profile obtained from a sample subject overlays with the peak(s) displayed in a mass spectrometric profile obtained from a known, control, and/or reference sample.

Methods for machine learning and statistical approaches used for classification are described in U.S. Pat. Nos. 10,877,040, 8,822,159, and U.S. Patent Pub. US20190391157, which are incorporated by reference for the teaching of these methods.

In some embodiments, the generated fingerprint is matched to a known fingerprint to identify a specific entity. In other embodiments, the fingerprint is unknown but is compared to similar fingerprints to provide a classification, such as family or genus for an organism. In some embodiments, fingerprints are generated for groups of organisms based on biological similarities. For example, the fingerprint could determine that whether a bacterium is Gram positive or negative.

A number of embodiments of the invention have been described. Nevertheless, it will be understood that various modifications may be made without departing from the spirit and scope of the invention. Accordingly, other embodiments are within the scope of the following claims.

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will recognize, or be able to ascertain using no more than routine experimentation, many equivalents to the specific embodiments of the invention described herein. Such equivalents are intended to be encompassed by the following claims.

What is claimed is:

1. A method for analyzing a biological analyte, comprising:
   (a) ionize the biological analyte to produce a mixture of ions;
   (b) obtaining and recording a parent mass spectrum for the mixture of ions in a first stage of mass analysis (MS1) without fragmentation;
   (c) obtaining and recording a series of mass spectra for the mixture of ions in a second stage of mass analysis (MS2) with fragmentation using predefined mass windows within the parent spectrum; and
   (d) generating a multi-dimensional fingerprint from the combination of MS1 and MS2 mass spectral data.

2. The method of claim 1, wherein the biological analyte is derived from a pathogenic bacteria or virus.

3. The method in claim 1, wherein the biological analyte is derived from a tissue sample.

4. The method in claim 1, wherein the biological analyte is derived from one or more of the following sources: mammals, microbes, or exogenous compounds.

5. The method of claim 1, wherein the biological analyte represents a mixture one or more of the following: proteins, peptides, lipids, metabolites, nucleic acids, drugs, toxins, or other exogenous molecules.

6. The method of claim 1, wherein the biological analyte comprises a bacterial or viral pathogen.

7. The method of claim 1, wherein the predefined mass windows are approximately 100-200 m/z in size.

8. The method of claim 1, wherein the predefined mass windows are non-overlapping.

9. The method of claim 1, wherein the predefined mass windows are overlapping.

10. The method of claim 1, wherein step (c) is repeated for at least 5 predefined mass windows within the parent spectrum.

11. The method of claim 1, wherein steps (a) and (b) are obtained using low resolution tandem mass spectrometry.

12. A method for analyzing biological analytes, comprising:
(a) selective ionization of spatially-defined cell types from a region of interest;
(b) ionize the biological analytes to produce a mixture of ions;
(c) obtaining and recording a parent mass spectrum for the mixture of ions in a first stage of mass analysis (MS1) without fragmentation;
(d) obtaining and recording a series of mass spectra for the mixture of ions in a second stage of mass analysis (MS2) with fragmentation using predefined mass windows within the parent spectrum;
(e) generating a multi-dimensional fingerprint from the combination of MS1 and MS2 mass spectral data.

13. The method of claim 12, wherein the spatial information is used to classify the disease state of the cells within the defined region of interest.

14. The method of claim 12, wherein the spatial information is used to render an image of the tissue based on the position of the molecules or disease state.

* * * * *